US012769568B2

(12) United States Patent
Chen et al.

(10) Patent No.: US 12,769,568 B2
(45) Date of Patent: Oct. 20, 2026

(54) GENERATING INSTRUCTIONS FOR USER INTERFACE CHANGES BASED ON VERSION UPDATES

(71) Applicant: International Business Machines Corporation, Armonk, NY (US)

(72) Inventors: Dong Chen, Beijing (CN); Xiang Wei Li, Beijing (CN); Xiang Juan Meng, Beijing (CN); Ting Ting Zhan, Beijing (CN); Xiao Juan Chen, Beijing (CN); Ye Huo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 18/599,320

(22) Filed: Mar. 8, 2024

(65) Prior Publication Data

US 2025/0284507 A1 Sep. 11, 2025

(51) Int. Cl.

*G06F 9/451* (2018.01)
*G06F 3/04842* (2022.01)
*G10L 25/63* (2013.01)

(52) U.S. Cl.

CPC .......... *G06F 9/453* (2018.02); *G06F 3/04842* (2013.01); *G10L 25/63* (2013.01)

(58) Field of Classification Search

CPC ....... G06F 3/04842; G06F 9/453; G10L 35/63
See application file for complete search history.

(56) References Cited

U.S. PATENT DOCUMENTS

| | | | | |
|---|---|---|---|---|
| 9,250,766 | B2 * | 2/2016 | Gil | G06F 3/0482 |
| 2021/0390011 | A1 * | 12/2021 | Cser | G06N 3/08 |
| 2022/0121337 | A1 * | 4/2022 | Zohar | G06F 8/38 |
| 2022/0342514 | A1 * | 10/2022 | Chao | G06F 3/0362 |

FOREIGN PATENT DOCUMENTS

| | | | |
|---|---|---|---|
| CN | 103631513 | A | 3/2014 |
| CN | 104615787 | B | 5/2018 |
| CN | 108874392 | A | 11/2018 |
| CN | 105302576 | B | 12/2018 |
| CN | 109426428 | A | 3/2019 |
| CN | 111475070 | B | 4/2022 |

OTHER PUBLICATIONS

"AI-enabled Quality Documentation and Reference Systems", An IP.com Prior Art Database Technical Disclosure, IP.com No. IPCOM000268659D, IP.com Electronic Publication Date: Feb. 14, 2022, 7 pages, <https://priorart.ip.com/IPCOM/000268659>.

* cited by examiner

*Primary Examiner* — Seth A Silverman
(74) *Attorney, Agent, or Firm* — Anthony M. Pallone

(57) ABSTRACT

A method, computer program product, and computer system are provided for generating instructions for user interface changes based on version updates. First data corresponding to a first input by a user on a first version of a user interface is received. An interface element on a second version of the user interface corresponding to the first input is identified. The second version of the user interface corresponds to an older version of the user interface than the first version. The second version of the user interface and the interface element are displayed to the user. Second data corresponding to a second input by the user on the displayed second version of the user interface is received. The first version of the user interface and a toast or tooltip corresponding to a new location of the interface element within the first version of the user interface are displayed to the user.

11 Claims, 7 Drawing Sheets

GENERATING INSTRUCTIONS FOR USER INTERFACE CHANGES BASED ON VERSION UPDATES

FIELD

This disclosure relates generally to the field of graphical user interfaces, and more particularly to user interface help techniques.

BACKGROUND

A graphical user interface (GUI) is a form of user interface that allows users to interact with electronic devices through graphical icons and visual indicators. In many applications, GUIs are used instead of text-based UIs, which are based on typed command labels or text navigation. The actions in a GUI are usually performed through direct manipulation of the graphical elements.

SUMMARY

Embodiments relate to a method, system, and computer program product for generating instructions for user interface changes based on version updates. According to one aspect, a method for generating instructions for user interface changes based on version updates is provided. The method may include receiving first data corresponding to a first input by a user on a first version of a user interface. An interface element on a second version of the user interface corresponding to the first input is identified. The second version of the user interface corresponds to an older version of the user interface than the first version. The second version of the user interface and the interface element are displayed to the user. Second data corresponding to a second input by the user on the displayed second version of the user interface is received. The first version of the user interface and a toast or tooltip corresponding to a new location of the interface element within the first version of the user interface are displayed to the user.

According to another aspect, a computer system for generating instructions for user interface changes based on version updates is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving first data corresponding to a first input by a user on a first version of a user interface. An interface element on a second version of the user interface corresponding to the first input is identified. The second version of the user interface corresponds to an older version of the user interface than the first version. The second version of the user interface and the interface element are displayed to the user. Second data corresponding to a second input by the user on the displayed second version of the user interface is received. The first version of the user interface and a toast or tooltip corresponding to a new location of the interface element within the first version of the user interface are displayed to the user.

According to yet another aspect, a computer program product for generating instructions for user interface changes based on version updates is provided. The computer program product may include one or more computer-readable tangible storage devices and program instructions stored on at least one of the one or more tangible storage devices, the program instructions executable by a processor. The program instructions are executable by a processor for performing a method that may accordingly include receiving first data corresponding to a first input by a user on a first version of a user interface. An interface element on a second version of the user interface corresponding to the first input is identified. The second version of the user interface corresponds to an older version of the user interface than the first version. The second version of the user interface and the interface element are displayed to the user. Second data corresponding to a second input by the user on the displayed second version of the user interface is received. The first version of the user interface and a toast or tooltip corresponding to a new location of the interface element within the first version of the user interface are displayed to the user.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
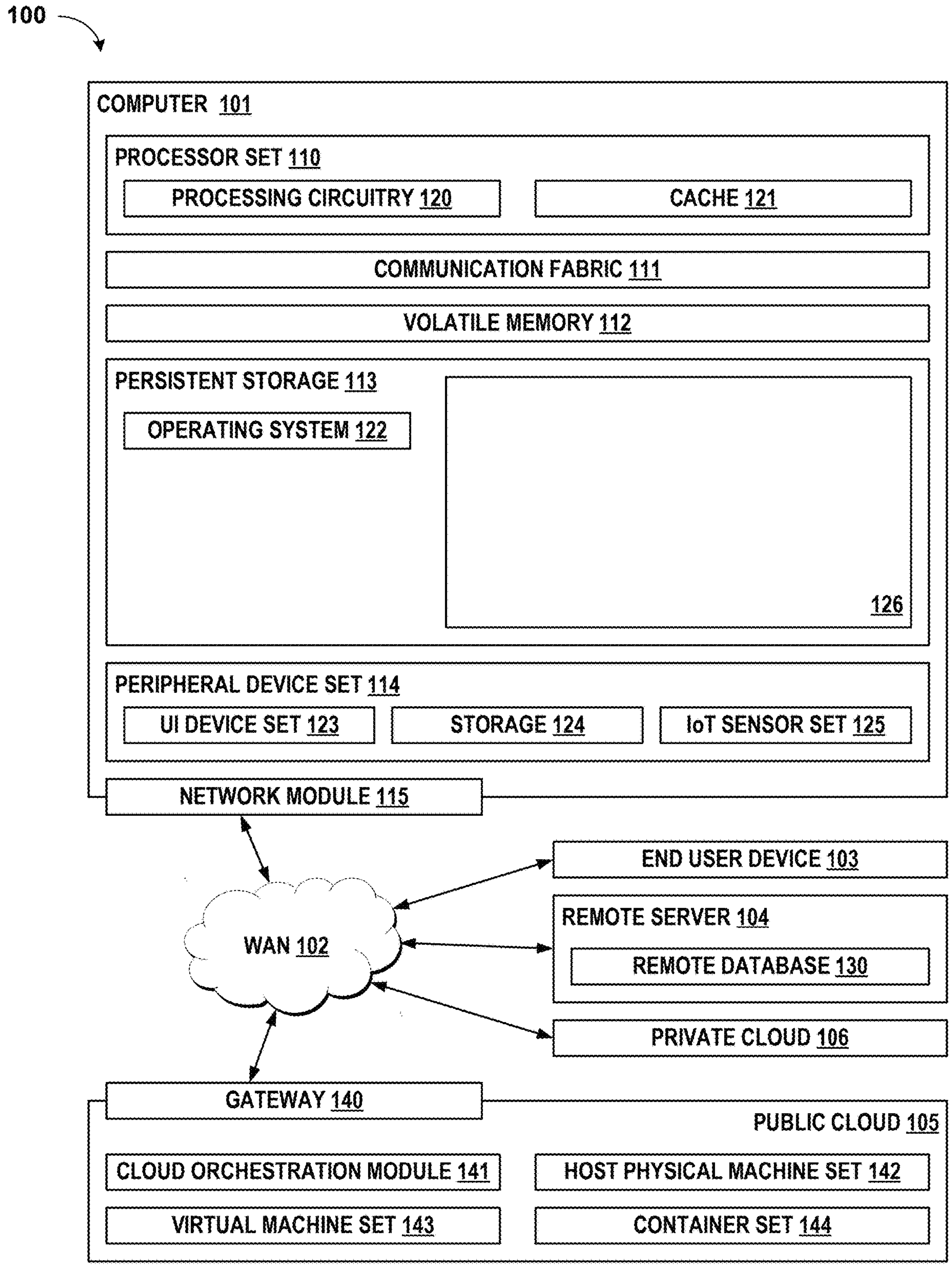
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of graphical user interfaces, and more particularly to user interface help techniques. The following described exemplary embodiments provide a system, method, and computer program product to, among other things, generate instructions for changes to the user interface through a "gradient" interface mode. Therefore, some embodiments have the capacity to improve the field of computing by allowing for improved efficiency of users using the new version of the application after the application interface is updated.

As previously described, a graphical user interface (GUI) is a form of user interface that allows users to interact with electronic devices through graphical icons and visual indicators. In many applications, GUIs are used instead of text-based UIs, which are based on typed command labels or text navigation. The actions in a GUI are usually performed through direct manipulation of the graphical elements. Graphical user interface help techniques may include several methods, such as toasts, tooltips, and balloon help. However, software products are being updated faster and faster, and their user interfaces are constantly changing. Update iterations may occur so quickly that users may not be able to quickly find one or more new features in the new user interface that were present in an older version of the user interface. Although the interface of the upgraded user interface will have pop-up guidance information, this may be much less efficient and may not allow users to get effective help. It may be advantageous, therefore, to generate instructions, such as user interface help instructions, for user interface changes based on a product version update f a gradient between the old user interface and the new user interface.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program product that generates instructions for user interface changes based on version updates. Referring now to FIG. 1, Computing environment 100 contains an example of an environment for the execution of at least some of the computer code involved in performing the inventive methods, such as Gradient User Interface Program 126. In addition to Gradient User Interface Program 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Gradient User Interface Program 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Gradient User Interface Program 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Gradient User Interface Program 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer 101 of software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
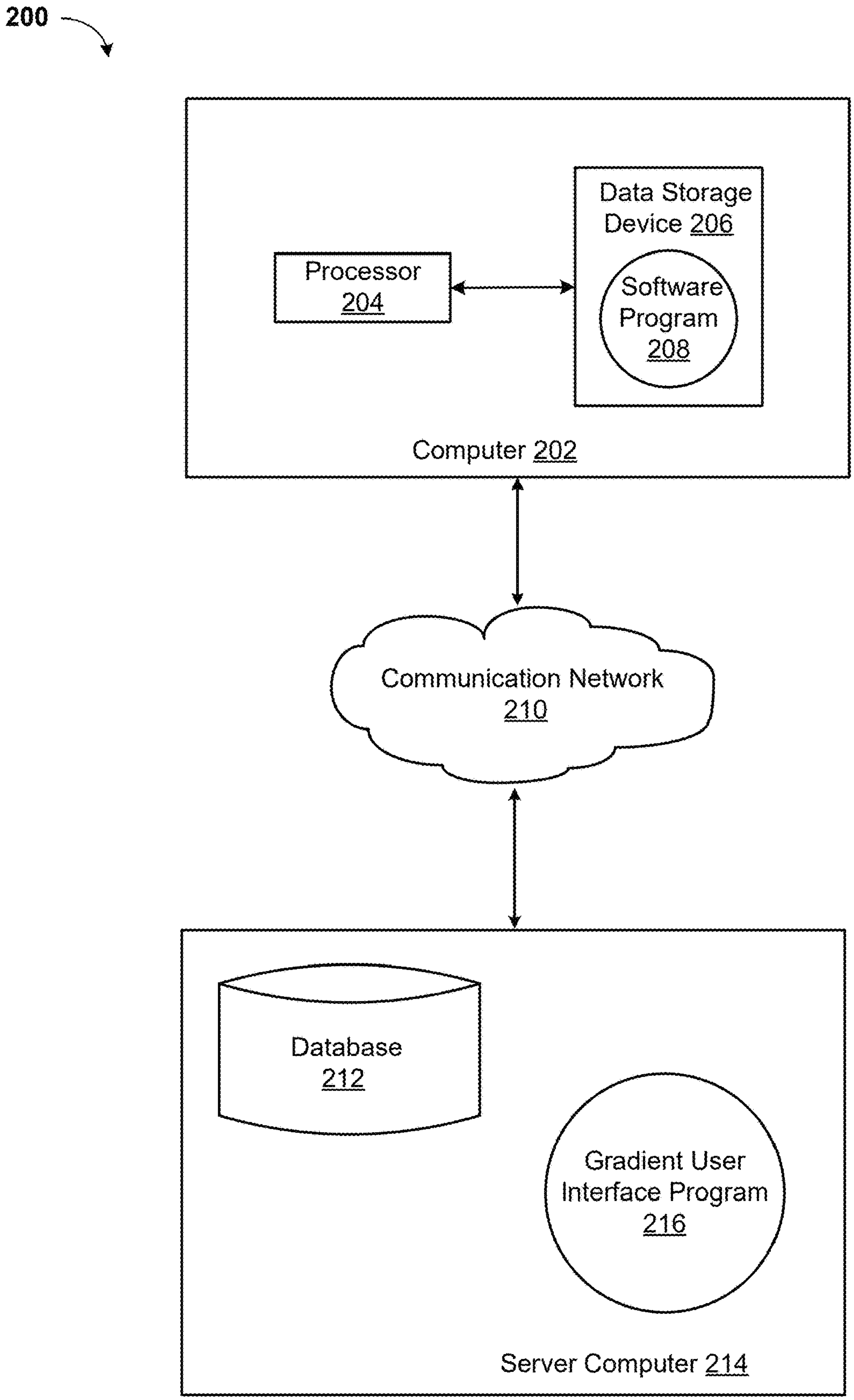
FIG. 2 illustrates a networked computer environment according to at least one embodiment.

Referring now to FIG. 2, a functional block diagram of a networked computer environment illustrating a gradient user interface help system 200 (hereinafter "system") for generating instructions for user interface changes based on version updates. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for generating instructions for user interface changes based on version updates is enabled to run a Gradient User Interface Program 216 (hereinafter "program") that may interact with a database 212. The Gradient User Interface program is explained in more detail below with respect to FIG. 5. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
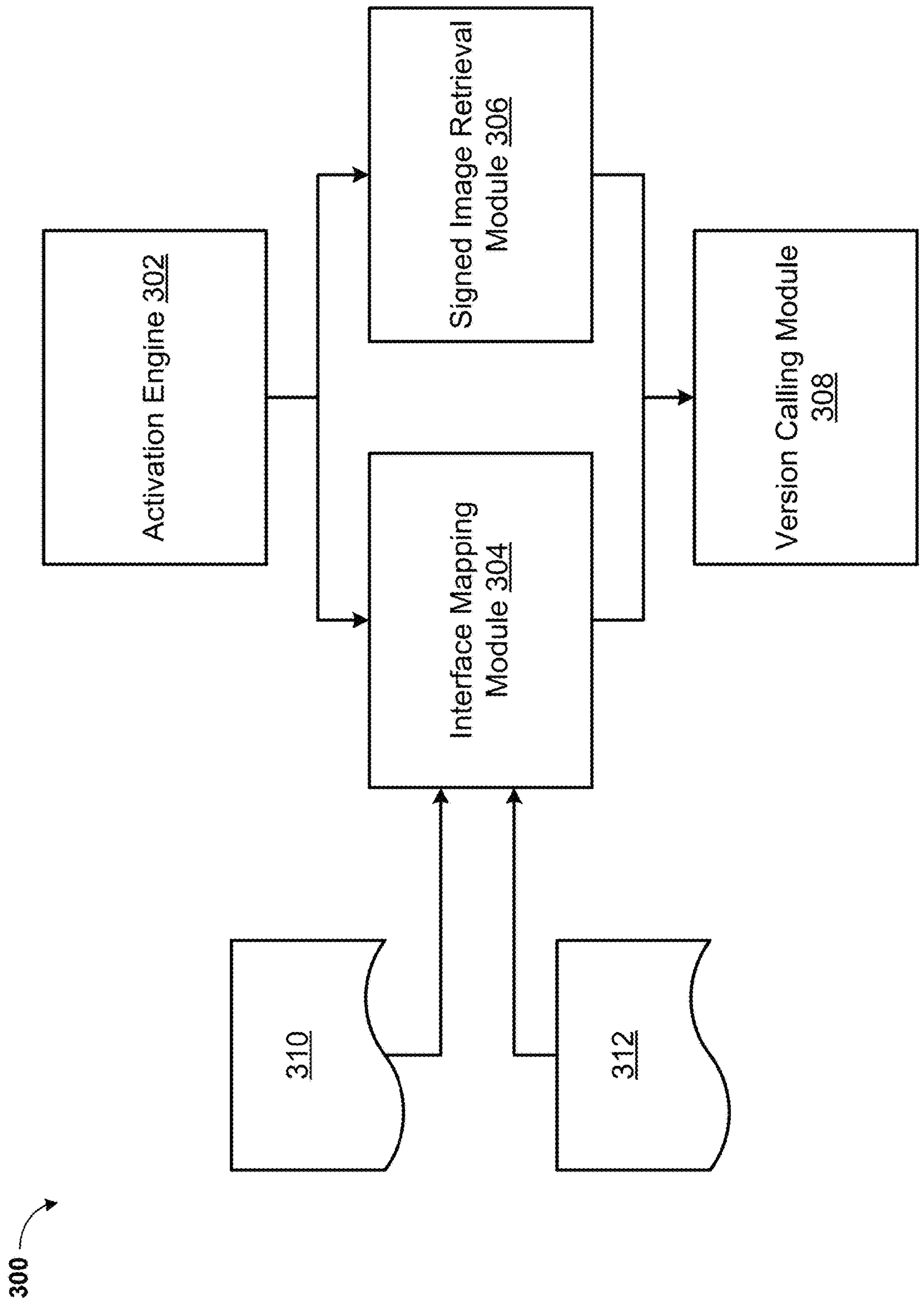
FIG. 3 is a block diagram of a system for generating instructions for user interface changes based on version updates, according to at least one embodiment.

Referring now to FIG. 3, a block diagram of an interface gradient guide tours system 300 is depicted according to one or more embodiments. The interface gradient guide tours system 300 may include, among other things, an activation engine 302, an interface mapping module 304, a signed image retrieval module 306, and a version calling module 308.

The activation engine 302 may automatically discover user guidance requirements and activate interface gradient guide tours (i.e., showing hints by transitioning between old and new versions of the user interface) when triggering conditions are met. These conditions may include, among other things, mouse hover area inputs and user voice inputs. For example, the activation engine 302 may determine whether a user is holding their mouse cursor over a user interface element longer than a predetermined amount of time or, if the user has allowed the activation engine 302 to access their microphone, may identify a confused tone in the user's voice or voice cues such as "I can't find X" or "Where is Y?" The activation engine 302 may determine the user interface element based on the coordinates of the user's mouse or may use natural language processing to extract the correct element from the user voice cues.

The interface mapping module 304 may match elements between the new user interface version and the old user interface version. The matching records may be used to call the corresponding modules or interfaces in different versions. The interface mapping module 304 may access old version data 310 that may correspond to a previous version of the user interface display but that may not include the interface image file and may access new version data 312 that may focus on area names, coordinates, and contexts. The interface mapping module 304 may record changed areas in the user interface between the old and new versions based on the old version data 310 and the new version data 312. The interface mapping module 304 may determine which user interface image files may need to be called based on the old version data 310 and the new version data 312.

The signed image retrieval module 306 may retrieve an older version of the user interface in the form of signed images that may contain the coordinate position of the content change area. The signed image retrieval module 306 may determine that a user has clicked the corresponding area in order to trigger a user interface switch back to the new version.

The version calling module 308 may switch the display between the new version of the user interface and the old version of the user interface. The version calling module 308 may emphasize the display of regional content for which users have requirements, as well as the old and new matches. The version calling module 308 may cause a notification, such as a toast, a tooltip, or balloon help, to show the user the location of the regional content such that the user may learn the new user interface.

Figure 4A:
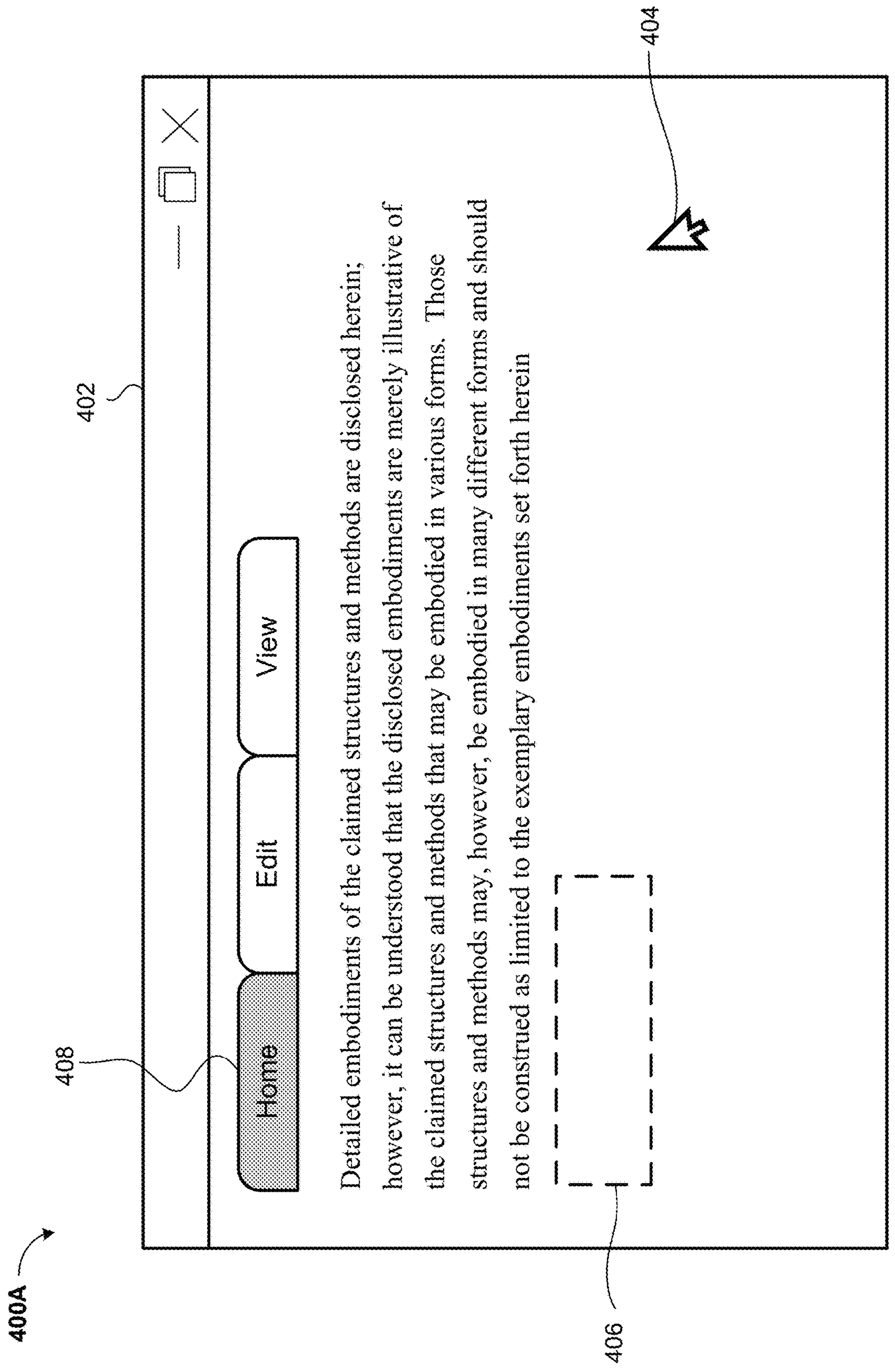
FIGS. 4A-4C are exemplary views of a gradient user interface help system, according to at least one embodiment.
Figure 4B:
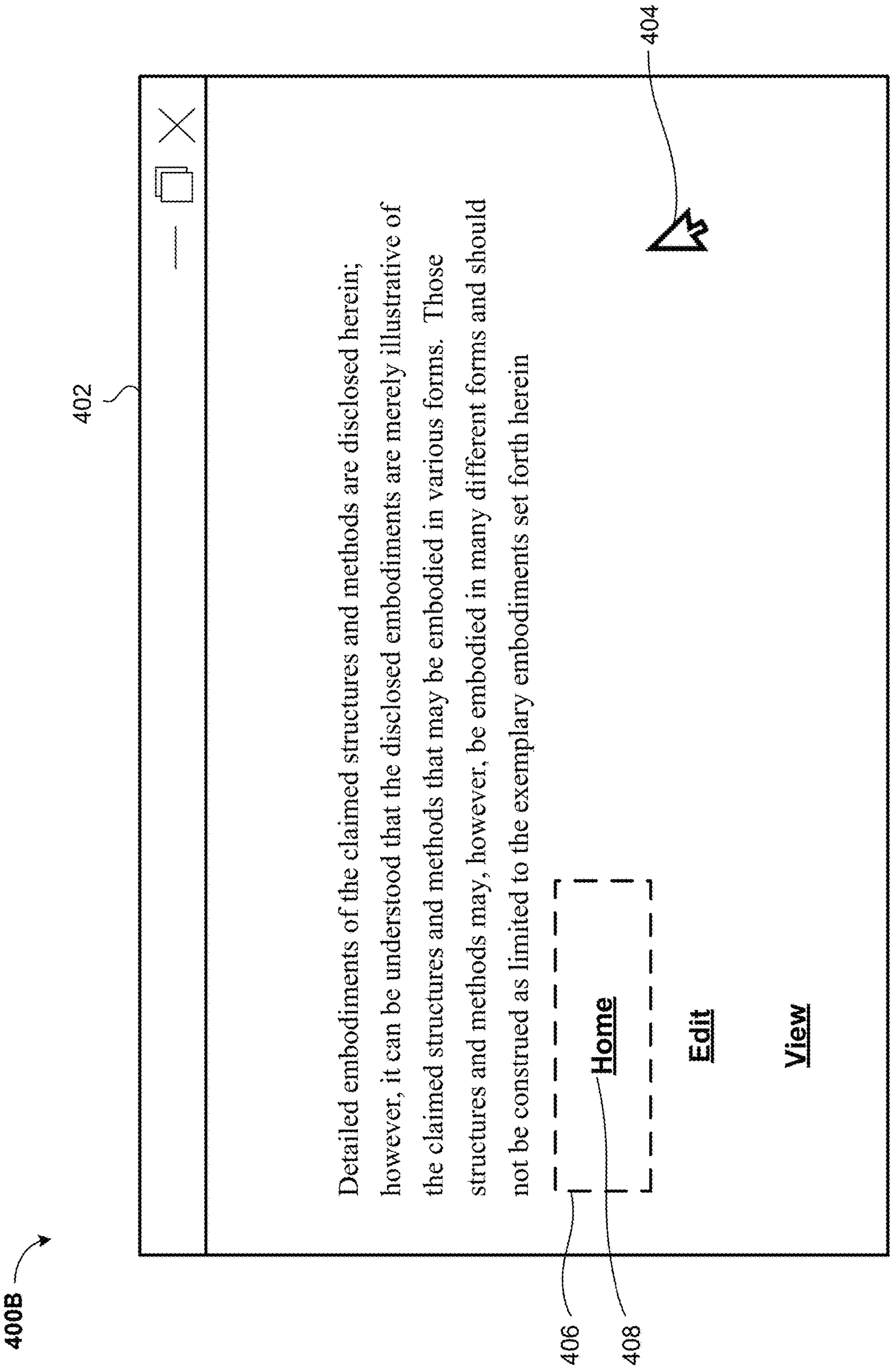
Figure 4C:
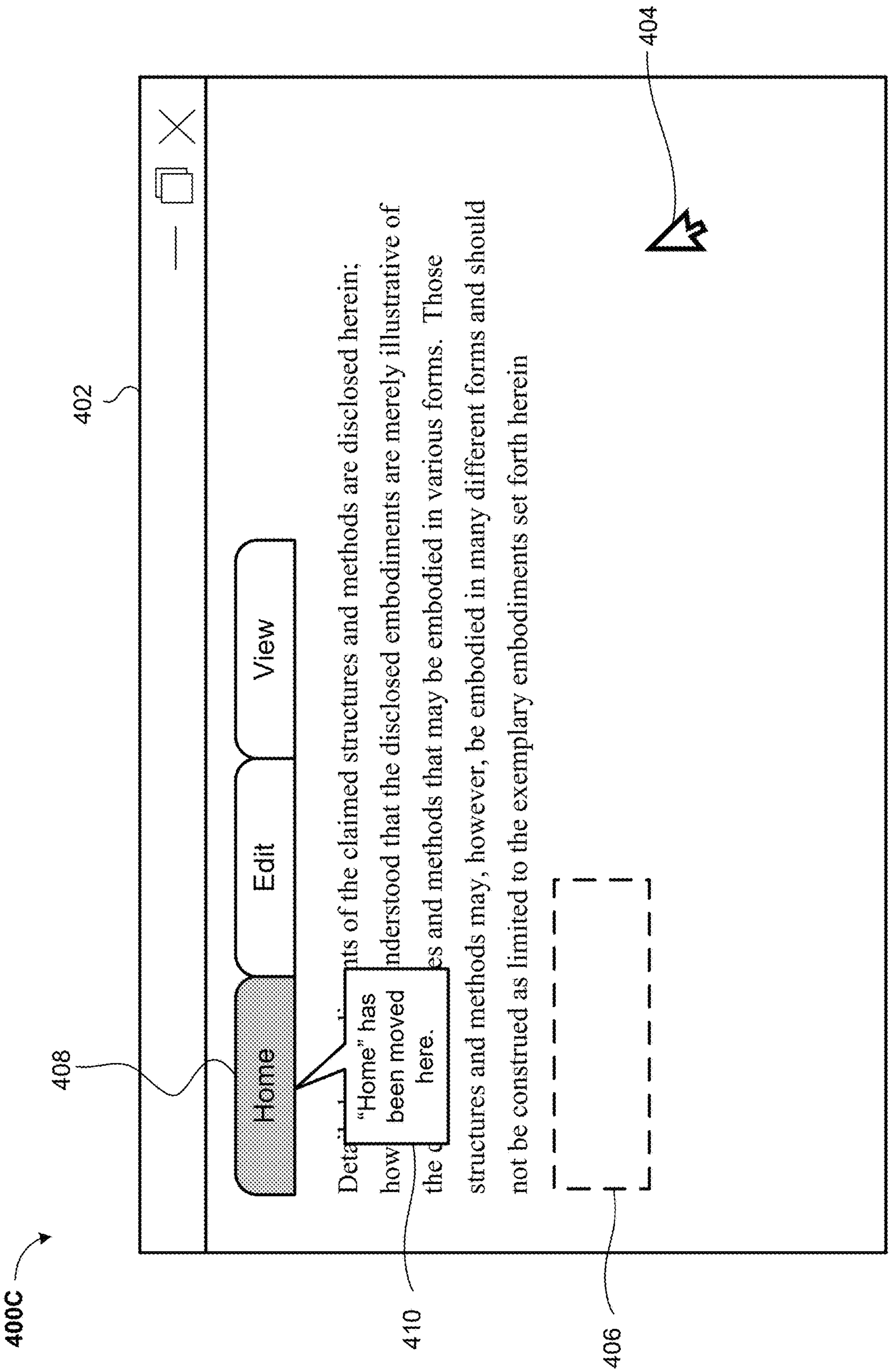

Referring now to FIGS. 4A-4C, exemplary views 400A-400C illustrating a gradient user interface help system are depicted according to one or more embodiments. The user interface help system may be described with the aid of the exemplary embodiments of FIG. 3.

Referring now to FIG. 4A, a view 400A of the gradient user interface help system is depicted according to one or more embodiments. The view 400A may include a window 402, a cursor 404, a user interface region 406, and a user interface element 408. For ease of depiction, only one user interface region 406 and user interface element 408 are shown in FIGS. 4A-4C. However, it may be appreciated that the window 402 may include any number of user interface regions 406 and user interface elements 408. When the user may move the cursor 404 to and hover over a user interface region 406 within the window 402A for longer than a predetermined amount of time, the activation engine 302 (FIG. 3) may determine that the user may wish to select a user interface element 408 that previously resided in the user interface region 406 in an older version of the user interface. The interface mapping module 304 (FIG. 3) may determine which user interface element 408 the user may wish to select and may cause the signed image retrieval module 306 (FIG. 3) to retrieve signed image files containing the appropriate user interface element 408.

Referring now to FIG. 4B, a view 400A of the gradient user interface help system is depicted according to one or more embodiments. The view 400A may include the window 402, the cursor 404, the user interface region 406, and the user interface element 408. The version calling module 308 (FIG. 3) may cause the older version of the user interface retrieved by the signed image retrieval module 306 (FIG. 3) to be displayed to the user. Such older version of the user interface may include, for example, the user interface element 408 located within the user interface region 406 of the window 402 over which the user hovered the cursor 404.

Referring now to FIG. 4C, a view 400C of the gradient user interface help system is depicted according to one or more embodiments. The view 400C may include the window 402, the cursor 404, the user interface region 406, the user interface element 408, and a notification 410. The version calling module 308 (FIG. 3) may wait for the user to click on the user interface element 408 on the older version of the user interface. The version calling module 308 may switch the window 402 back to the new version of the user interface and may display the notification 410 pointing to a new location of the user interface element 408 within the new version of the user interface. The notification 410 may be, among other things, a toast, a tooltip, balloon help, or the like. The version calling module 308 may also display other related notifications to the user.

Figure 5:
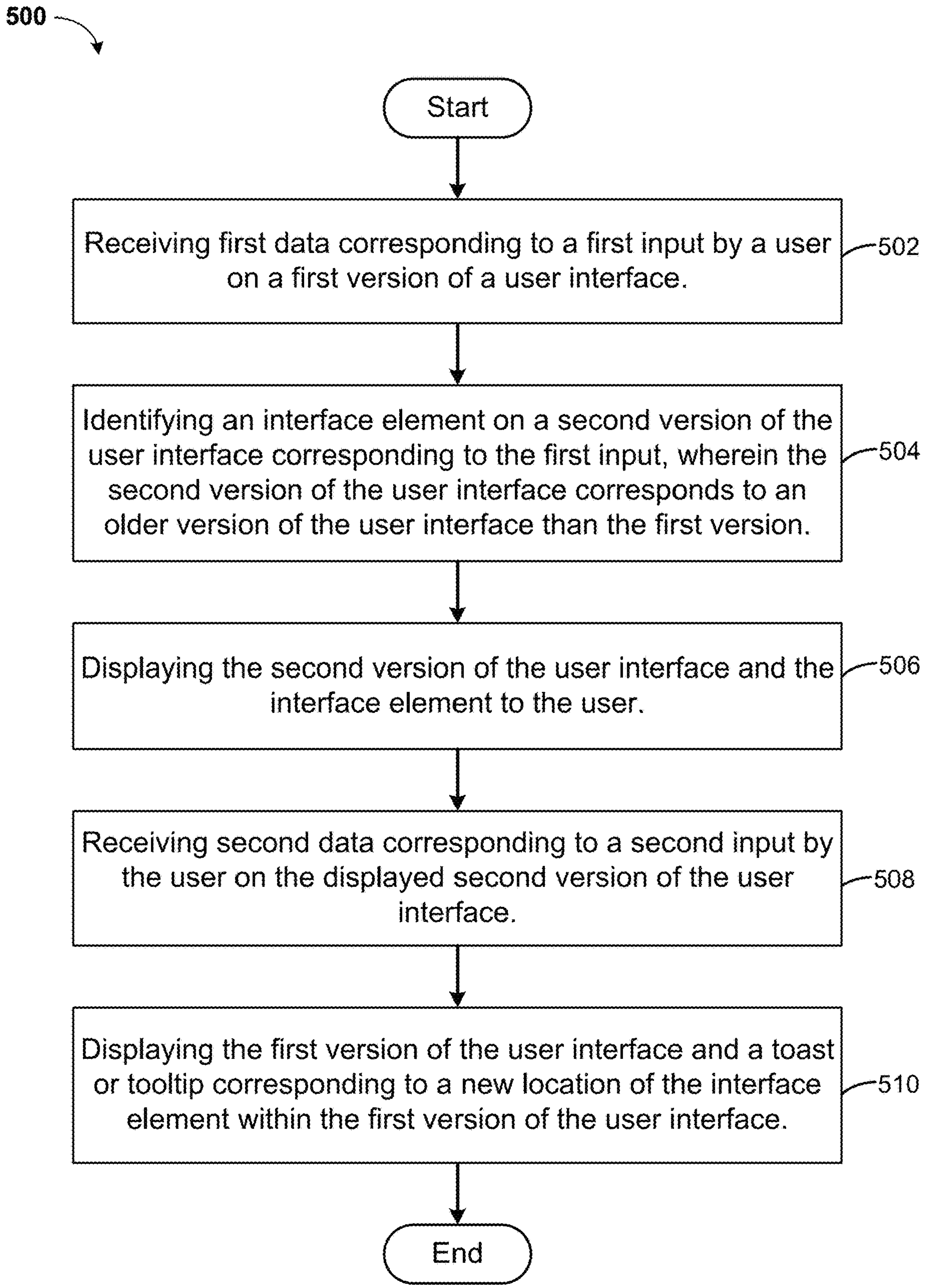
FIG. 5 is an operational flowchart illustrating the steps carried out by a program that generating instructions for user interface changes based on version updates, according to at least one embodiment.

Referring now to FIG. 5, an operational flowchart illustrating the steps of a method 500 carried out by a program that generates instructions for user interface changes based on version updates is depicted. The method 500 may be described with the aid of the exemplary embodiments of FIGS. 1-3 and 4A-4C.

At 502, the method 500 may include receiving first data corresponding to a first input by a user on a first version of a user interface. The first input corresponds to detecting a tone of confusion in a voice of the user or to the user hovering a cursor over the first version of the user interface for a predetermined amount of time. In operation, a user may be using the software program 208 (FIG. 2) on the computer 202 (FIG. 2) after a user interface update (i.e., the first version of the user interface is an updated or newer version of the user interface). The user may be unable to locate the user interface element 408 (FIG. 4A) within the user interface region 406 (FIG. 4A) in which the user interface element 408 used to reside and may hover the cursor 404

(FIG. 4A) over the user interface region 406, which the activation engine 302 (FIG. 3) may then detect.

At 504, the method 500 may include identifying an interface element on a second version of the user interface corresponding to the first input. The second version of the user interface corresponds to an older version of the user interface than the first version. Coordinates of the cursor correspond to coordinates of the interface element on the second version of the user interface. In operation, the interface mapping module 304 (FIG. 3) may determine the coordinates of the cursor 404 (FIG. 4A) within the user interface region 406 (FIG. 4A) of the window 402 (FIG. 4A) and identify which user interface element 408 (FIG. 4A) used to reside within the user interface region 406.

At 506, the method 500 may include displaying the second version of the user interface and the interface element to the user. The second version of the user interface and the interface element to the user are displayed to the user based on retrieving signed images corresponding to the second version of the user interface and the interface element. In operation, the signed image retrieval module 306 (FIG. 3) may retrieve the resources necessary to display the older version of the user interface to the user. The version calling module 308 (FIG. 3) may switch the window 402 (FIGS. 4A, 4B) from view 400A (FIG. 4A) to view 400B (FIG. 4B), in which the user interface element 408 (FIG. 4B) may be displayed within the user interface region 406 (FIG. 4B).

At 508, the method 500 may include receiving second data corresponding to a second input by the user on the displayed second version of the user interface. The second input corresponds to a mouse click on the interface element on the second version of the user interface by the user. In operation, the version calling module 308 (FIG. 3) may await a click of the cursor 404 (FIG. 4B) by the user on the user interface element 408 (FIG. 4B).

At 510, the method 500 may include displaying the first version of the user interface and a toast or tooltip corresponding to a new location of the interface element within the first version of the user interface. Additional toasts or tooltips that are related to the displayed toast or tooltip may be provided. In operation, the version calling module 308 (FIG. 3) may cause the window 402 (FIGS. 4B, 4C) to switch from view 400B (FIG. 4B) to view 400C (FIG. 4C) and display the notification 410 (FIG. 4C) that points to the new location of the user interface element 408 (FIG. 4C).

It may be appreciated that FIG. 5 provides only an illustration of one implementation and does not imply any limitations with regard to how different embodiments may be implemented. Many modifications to the depicted environments may be made based on design and implementation requirements.

Some embodiments may relate to a system, a method, and/or a computer program product at any possible technical detail level of integration. The computer program product may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles “a” and “an” are intended to include one or more items and may be used interchangeably with “one or more.” Furthermore, as used herein, the term “set” is intended to include one or more items (e.g., related items, unrelated items, a combination of related and unrelated items, etc.), and may be used interchangeably with “one or more.” Where only one item is intended, the term “one” or similar language is used. Also, as used herein, the terms “has,” “have,” “having,” or the like are intended to be open-ended terms. Further, the phrase “based on” is intended to mean “based, at least in part, on” unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating instructions for user interface changes based on version updates, executable by a processor, comprising:

receiving first data corresponding to a first input by a user on a first version of a user interface, wherein the first input corresponds to the user hovering a cursor over a region of the first version of the user interface for a predetermined amount of time;

based on coordinates of the cursor, identifying an interface element on a second version of the user interface, wherein the second version of the user interface corresponds to an older version of the user interface than the first version, and wherein the coordinates of the cursor correspond to coordinates of the interface element within the second version;

displaying, in place of the first version, the second version of the user interface with the interface element to the user;

receiving second data corresponding to a second input by the user on the displayed second version of the user interface, wherein the second input corresponds to a mouse click by the user on the interface element within the second version of the user interface; and in response to the mouse click, displaying, in place of the second version, the first version of the user interface and a toast or tooltip which shows the user a new location of the interface element within the first version of the user interface.

2. The method of claim 1, wherein the first input corresponds to detecting a tone of confusion in a voice of the user.

3. The method of claim 1, wherein the second version of the user interface and the interface element to the user are displayed to the user based on retrieving signed images corresponding to the second version of the user interface and the interface element.

4. The method of claim 1, further comprising providing one or more additional toasts or tooltips, wherein the one or more additional toasts or tooltips are related to the displayed toast or tooltip.

5. A computer system for generating instructions for user interface changes based on version updates, the computer system comprising:

one or more computer-readable storage media configured to store computer program code; and one or more computer processors configured to access said computer program code and operate as instructed by said computer program code, said computer program code including:

first receiving code configured to cause the one or more computer processors to receive first data corresponding to a first input by a user on a first version of a user interface, wherein the first input corresponds to the user hovering a cursor over a region of the first version of the user interface for a predetermined amount of time;

based on coordinates of the cursor, identifying code configured to cause the one or more computer processors to identify an interface element on a second version of the user interface, wherein the second version of the user interface corresponds to an older version of the user interface than the first version, and wherein the coordinates of the cursor correspond to coordinates of the interface element within the second version;

first displaying code configured to cause the one or more computer processors to display, in place of the first version, the second version of the user interface with the interface element to the user;

second receiving code configured to cause the one or more computer processors to receive second data corresponding to a second input by the user on the displayed second version of the user interface, wherein the second input corresponds to a mouse click by the user on the interface element within the second version of the user interface; and in response to the mouse click, second displaying code configured to cause the one or more computer processors to display, in place of the second version, the first version of the user interface and a toast or tooltip which shows the user a new location of the interface element within the first version of the user interface.

6. The computer system of claim 5, wherein the first input corresponds to detecting a tone of confusion in a voice of the user.

7. The computer system of claim 5, wherein the second version of the user interface and the interface element to the user are displayed to the user based on retrieving signed images corresponding to the second version of the user interface and the interface element.

8. The computer system of claim 5, wherein the computer program code stored on the one or more computer-readable storage media further includes:

providing code configured to cause the one or more computer processors to provide one or more additional toasts or tooltips, wherein the one or more additional toasts or tooltips are related to the displayed toast or tooltip.

9. A computer program product for generating instructions for user interface changes based on version updates, comprising:

one or more computer-readable storage devices; and program instructions stored on at least one of the one or more computer-readable storage devices, the program instructions configured to cause one or more computer processors to:

receive first data corresponding to a first input by a user on a first version of a user interface, wherein the first input corresponds to the user hovering a cursor over a region of the first version of the user interface for a predetermined amount of time;

based on coordinates of the cursor, identify an interface element on a second version of the user interface, wherein the second version of the user interface corresponds to an older version of the user interface than the first version, and wherein the coordinates of the cursor correspond to coordinates of the interface element within the second version;

display, in place of the first version, the second version of the user interface with the interface element to the user;

receive second data corresponding to a second input by the user on the displayed second version of the user interface, wherein the second input corresponds to a mouse click by the user on the interface element within the second version of the user interface; and in response to the mouse click, display, in place of the second version, the first version of the user interface and a toast or tooltip which shows the user a new location of the interface element within the first version of the user interface.

10. The computer program product of claim 9, wherein the first input corresponds to detecting a tone of confusion in a voice of the user.

11. The computer program product of claim 9, wherein the second version of the user interface and the interface element to the user are displayed to the user based on retrieving signed images corresponding to the second version of the user interface and the interface element.

* * * * *